United States Patent [19]
Plank, Jr. et al.

[11] Patent Number: 5,672,405
[45] Date of Patent: Sep. 30, 1997

[54] METAL-REINFORCED MOLDED-PLASTIC COMPOSITE STRUCTURES

[76] Inventors: J. Lee Plank, Jr., 18 Genoa La., Shavertown, Pa. 18708; Charles D. Flack, Jr., R.R. 4 Box 230, Dallas, Pa. 18612

[21] Appl. No.: 607,112

[22] Filed: Feb. 26, 1996

[51] Int. Cl.⁶ .................... B60R 19/03; B32B 3/10; B29C 70/00
[52] U.S. Cl. .................... 428/133; 428/139; 428/140; 428/132; 293/121; 293/120; 264/273; 264/274
[58] Field of Search .................... 428/139, 140, 428/132, 133; 293/121, 120; 264/273, 274

[56] References Cited

U.S. PATENT DOCUMENTS

| | | | |
|---|---|---|---|
| 2,064,435 | 12/1936 | Loeffler | 264/273 |
| 3,279,048 | 10/1966 | Grove et al. | 264/273 |
| 4,172,920 | 10/1979 | Kanda et al. | 428/403 |
| 4,234,638 | 11/1980 | Yamazoe et al. | 428/133 |
| 4,764,409 | 8/1988 | Freeman | 428/98 |
| 5,172,920 | 12/1992 | Schlenk | 277/235 R |
| 5,290,079 | 3/1994 | Syamal | 293/120 |

Primary Examiner—William Watkins
Attorney, Agent, or Firm—Michael Ebert

[57] ABSTRACT

A metal-reinforced, molded-plastic composite structure having an end use such as an automobile bumper, the reinforcement being constituted by a sheet of ductile metal having an array of holes punched therein, each bordered by a metal projection. In forming the composite structure, the metal sheet is supported within the cavity of a mold whose shape is appropriate to the end use. Molten plastic injected into the mold is caused to flow through the holes and to envelop the projections therefrom whereby when the plastic solidifies, the metal sheet is then fully integrated with the resultant plastic body and serves to enhance the resistance of the body to impact and other forces which in the absence of the reinforcing sheet would fracture the body.

10 Claims, 5 Drawing Sheets

100 5,672,405

METAL-REINFORCED MOLDED-PLASTIC COMPOSITE STRUCTURES

BACKGROUND OF INVENTION

1. Field of Invention

This invention relates generally to reinforced plastic parts, and in particular to a plastic part reinforced by a perforated metal sheet of high ductility to form a composite structure in which the metal sheet is fully integrated with the plastic body having the shape of the part, and to a method for producing the composite structure.

2. Status of Prior Art

It is known to provide composite structures in which a perforated metal core sheet is sandwiched between facing layers of plastic sheeting formed of Kelvar and similar materials. Thus the Schlenk U.S. Pat. No. 5,172,920 discloses a composite material for forming gaskets in which a metal core is sandwiched between facing layers of a packing material, the metal core being punched to provide a uniform array of square holes each bordered by projecting tangs that pierce the facing layers to interlock the core thereto.

The Freeman U.S. Pat. No. 4,764,409 discloses an automobile door in which a metal sheet is embedded in fiber-reinforced plastic material. To enhance the bond between the metal sheet and the plastic body, the metal sheet is provided with projecting fingers that penetrate the plastic body.

Of greater prior art interest is the Syamal U.S. Pat. No. 5,290,079 which discloses an auto bumper in the form of a molded plastic impact beam reinforced by glass fibers. A bumper of this type is designed to resist deformation during impact and reduce damage to the body and other components of the vehicle. However, with an impact beam formed of a high-strength moldable composite, such as a resin reinforced with glass fibers, this composite, as pointed out by Syamal, cannot sustain impact loads once a crack develops therein.

In order to resist forces which arise during compression of the impact beam, Syamal backs his molded plastic beam with ductile metal strips. But these metal strips are not integrated with the plastic beam and will therefore not prevent the beam from fracturing should it be subjected to heavy impact forces.

SUMMARY OF INVENTION

In view of the foregoing, the main object of this invention is to provide a molded plastic part reinforced by a ductile metal sheet which is integrated therewith to form a composite structure highly resistant to impact and other forces.

More particularly, an object of this invention is to provide a composite structure of the above type whose reinforcing metal sheet has an array of holes punched thereto, each hole being bordered by a metal projection whereby the holes are filled with the plastic and the projections are enveloped thereby to interlock the plastic body with the metal sheet.

Also an object of this invention is to provide a composite structure of the above type in which the reinforcing metal sheet is embedded within the plastic body or is integrated with a surface thereof, the plastic in either case filling the holes of the metal sheet and enveloping the projections therein to integrate and fully integrate the plastic body with the reinforcing metal sheet. Still another object of the invention is to provide a method for producing a composite structure of the above type.

Briefly stated, these objects are being attained by a metal-reinforced, molded-plastic composite structure having an end use such as an automobile bumper, the reinforcement being constituted by a sheet of ductile metal having an array of holes punched therein, each bordered by a metal projection.

In forming the composite structure, the metal sheet is supported within the cavity of a mold whose shape is appropriate to the end use. Molten plastic injected into the mold is caused to flow through the holes and to envelop the projections therefrom whereby when the plastic solidifies, the metal sheet is then fully integrated with the resultant plastic body and serves to enhance the resistance of the body to impact and other forces which in the absence of the reinforcing sheet would fracture the body.

BRIEF DESCRIPTION OF DRAWINGS

For a better understanding of the invention as well as other objects and features thereof, reference is made to the detailed description of the invention and the accompanying drawing wherein.

DESCRIPTION OF INVENTION

The Reinforcing Metal Sheet

Figure 1:
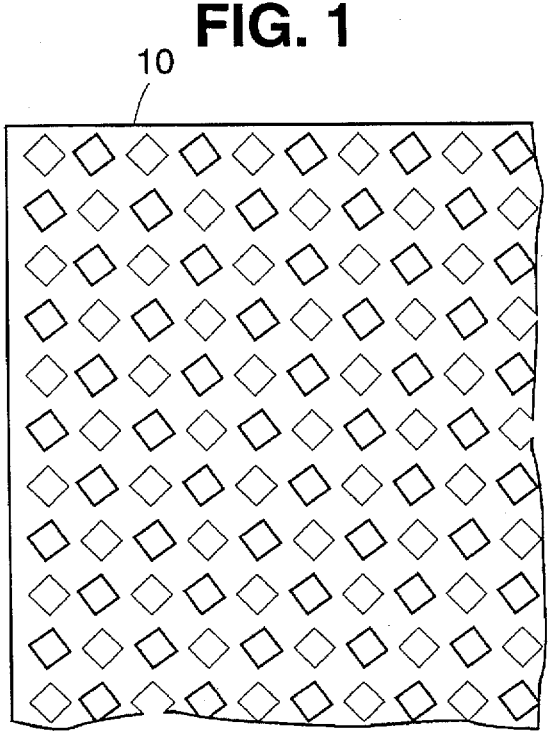
FIG. 1 shows a punched metal sheet which serves to reinforce a molded plastic part to form a composite structure in accordance with the invention.

FIG. 1 shows a thin metal sheet 10 suitable for reinforcing a molded plastic part to produce a composite structure in accordance with the invention. Sheet 10 is formed of a ductile metal, such as copper, aluminum or stainless steel, having the ability to be plastically deformed by elongation without fracture of the metal.

When ductile metal sheet 10 is integrated with a plastic body to form a composite structure in accordance with the invention, the metal sheet then acts to reinforce this body so as to render it resistant Go impact, stress and other forces which in the absence of the reinforcing sheet would cause the plastic body to fracture or break.

Figure 2:
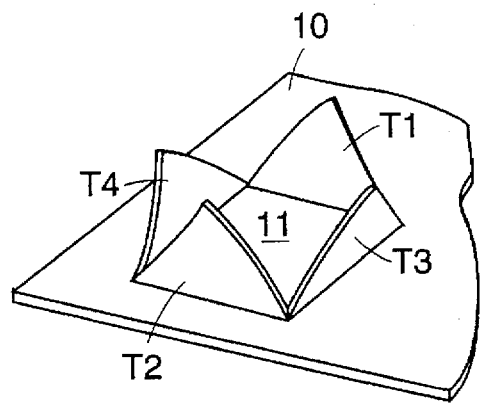
FIG. 2 shows one of the holes punched in the metal sheet and the projecting tangs produced thereby.

Metal sheet 10 is punched to create throughout its surface an array of square holes 12 from each of which a set of triangular tangs $T_1$ to $T_4$ is struck out which border the square hole, as shown in FIG. 2. A preferred technique for punching out these holes is disclosed in the Schlenk U.S. Pat. No. 5,172,920.

Figure 3:
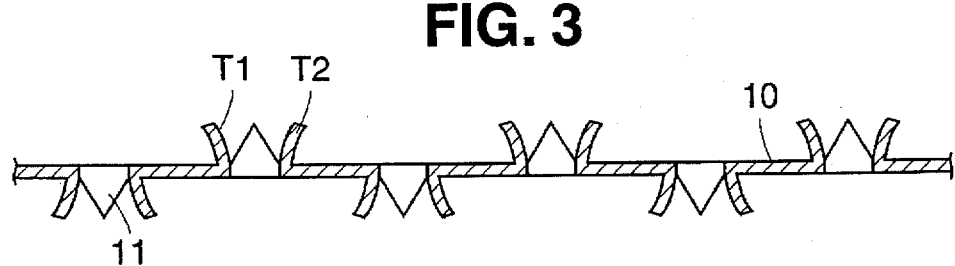
FIG. 3 is a section taken through the punched sheet shown in FIG. 1 in which the tangs project alternately from opposite sides.

Metal sheet 10 is preferably so punched that as shown in FIG. 3, the tang sets $T_1$ to $T_4$ struck out from alternate holes 11 in the array project from one side of the sheet, and the tang sets struck out of the other holes in the array project from the other side of the sheet.

Figure 3A:
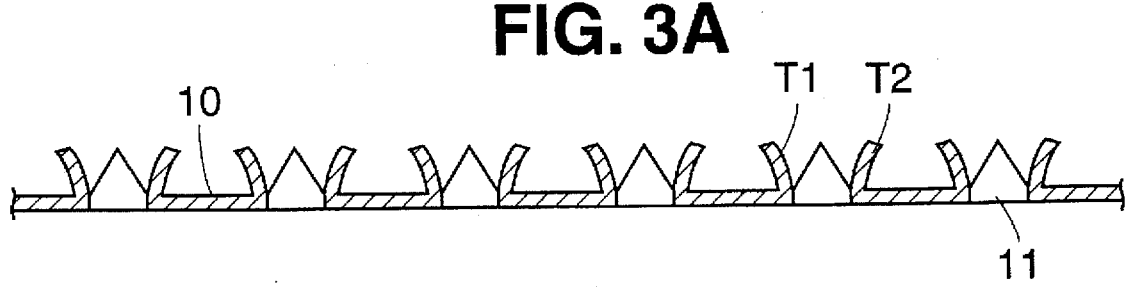
FIG. 3A is a section taken through a punched metal sheet in which the tangs only project from one side.

In some reinforced parts in accordance with the invention, the metal sheet is not embedded within the plastic body, but lies against a surface of the body in which case all tangs projecting from the metal sheet project into the body and are integrated therewith, no tangs projecting from the outer side of the metal sheet. A metal sheet suitable for this purpose is shown in FIG. 3A where it will be seen that the tangs $T_1$ and $T_2$ all project from the inner side of metal sheet 10.

Essential to the invention is that each hole punched in the metal sheet be bordered by outwardly projecting tangs or other metal projections such as collars struck out of the sheet by a punching operation. It is not essential however that the holes be in a square or any other geometric shape, nor that the projections take the form of triangular tangs.

Figure 4:
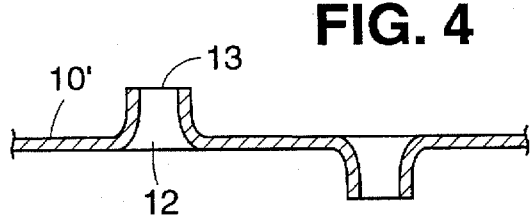
FIG. 4 shows punched holes in a metal sheet having collars projecting therefrom alternately from opposite sides of the sheet.

Thus as shown in FIG. 4, the holes 12 punched out of metal sheet 10 are round, and the projections then take the form of round collars 13 which border the round holes. The shape of the holes and of the projections are determined by the structure and configuration of the punches and of the complementary platen used to punch out the holes on alternate sides of the sheet. In the metal sheet 10' shown in FIG. 4A, the projections 13 are all of the inner side of the sheet, this being the appropriate form when the metal sheet is placed on the surface of the plastic body.

Metal-Reinforced Plastic Structure

A metal-reinforced plastic structure in accordance with the invention has many practical applications, for wherever a molded plastic part or body is in an environment which subjects the parts to impact and other forces, reinforcement is necessary to render the part capable of withstanding these forces. Thus a reinforced plastic structure in accordance with the invention may be used in a dashboard, a seat back and in other molded plastic parts.

Figure 5:
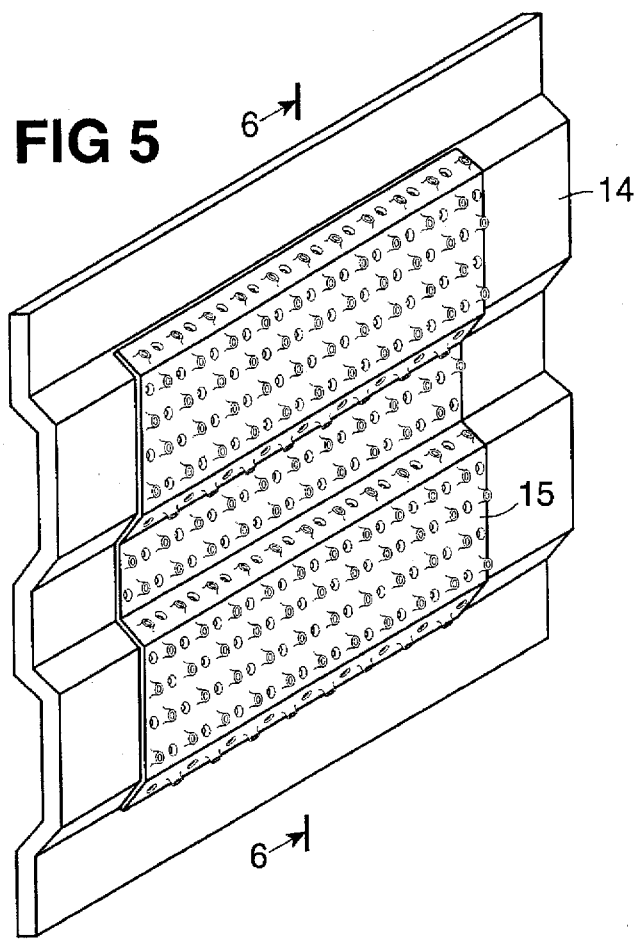
FIG. 5 is a perspective view of an automobile bumper formed by a metal-reinforced molded-plastic part in accordance with the invention.
Figure 6:
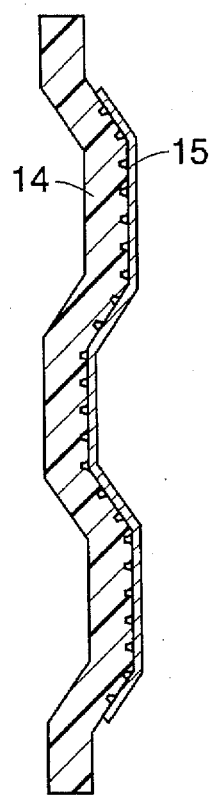
FIG. 6 is a section taken in the plane indicated by line 6—6 in FIG. 5.

FIGS. 5 and 6 show a composite structure formed by a molded plastic body 14 having a corrugated formation appropriate to an auto bumper. Embedded in the plastic body 14 and integrated therewith is a similarly-shaped punched metal sheet 15 of the type shown in FIG. 3 in which the tangs which border the holes alternately project from opposite sides of the metal sheet. In FIGS. 5 and 6, metal sheet 15, though it is embedded within the plastic body is shown on the surface of the body in order to more clearly illustrate the structure of the sheet. But had the metal sheet been actually placed on the surface of the body, all projections on the sheet would be inwardly directed.

Plastic body 14 may be molded of polyethylene, polypropylene, polycarbonate of other synthetic plastic material of high strength appropriate to the end use of the composite structure in which the reinforcing metal sheet is fully integrated with the plastic body, not laminated thereto.

Metal sheet 15 is not co-extensive with the plastic body 14 in which it is embedded, but is confined to that region of the bumper which is normally exposed to impact forces; this depending on the relationship of the bumper to the vehicle to which it is attached. In practice, however, metal sheet 15 may be coextensive with the plastic body.

When molding a composite structure of the type shown in FIGS. 5 and 6, the shape of the mold cavity must conform to that of the part to be molded therein, and the metal sheet must be preshaped to fit into and be supported within the mold cavity. The molten plastic material is then injected under pressure into the mold cavity and when the plastic solidifies, it then takes on the shape of the cavity.

Figure 7:
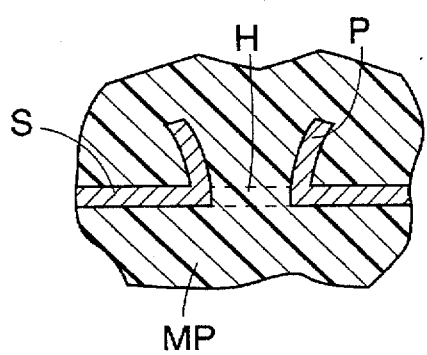
FIG. 7 shows the relationship between one hole in the metal sheet and the plastic embedding the sheet.

As illustrated in FIG. 7, in the course of the molding operation, the molten plastic MP flows through each hole H in the reinforcing metal sheet S and around projections P bordering the hole to envelop the projections. Hence when the molten plastic cures and solidifies, it then fills the hole and envelopes the projections, thereby interlocking and fully integrating the reinforcing metal sheet with the plastic body.

The reinforcing metal sheet is therefore inseparable from the plastic body and renders it highly resistant to impact and other forces which are capable in the absence of the metal sheet of fracturing or breaking the plastic body, even if the plastic body is reinforced by glass fibers as in the case of the bumper disclosed in the above-identified Syamal patent.

Figure 8:
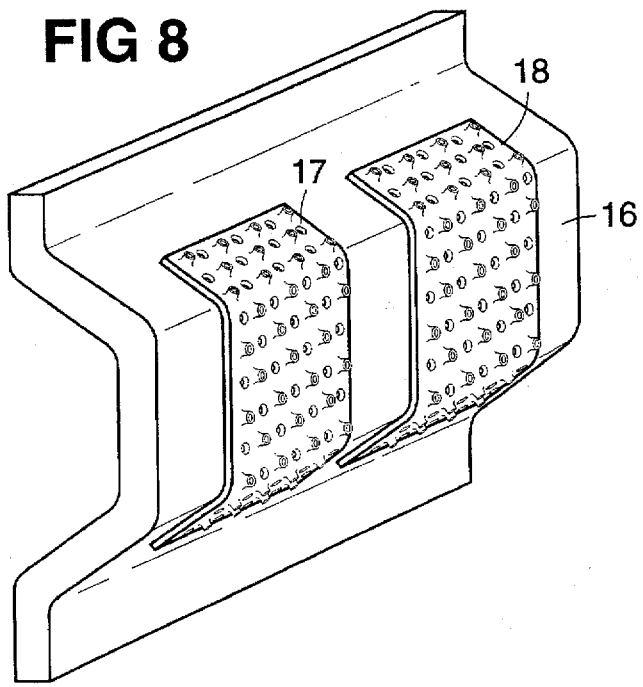
FIG. 8 shows another embodiment of an auto bumper.

FIG. 8 illustrates another embodiment of a composite structure in a bumper formation which in this instance has a molded plastic body 16 having a single corrugation. In this structure, embedded in plastic body 16 is a pair of spaced metal reinforcing metal sheets 17 and 18 placed at positions where the bumper is subjected to the highest impact forces. While in order to best show metal sheets 17 and 18 whose projections are on alternate sides of the sheet, the metal sheets are shown of the surface of plastic body 16, they are actually embedded within this body.

Figure 9:
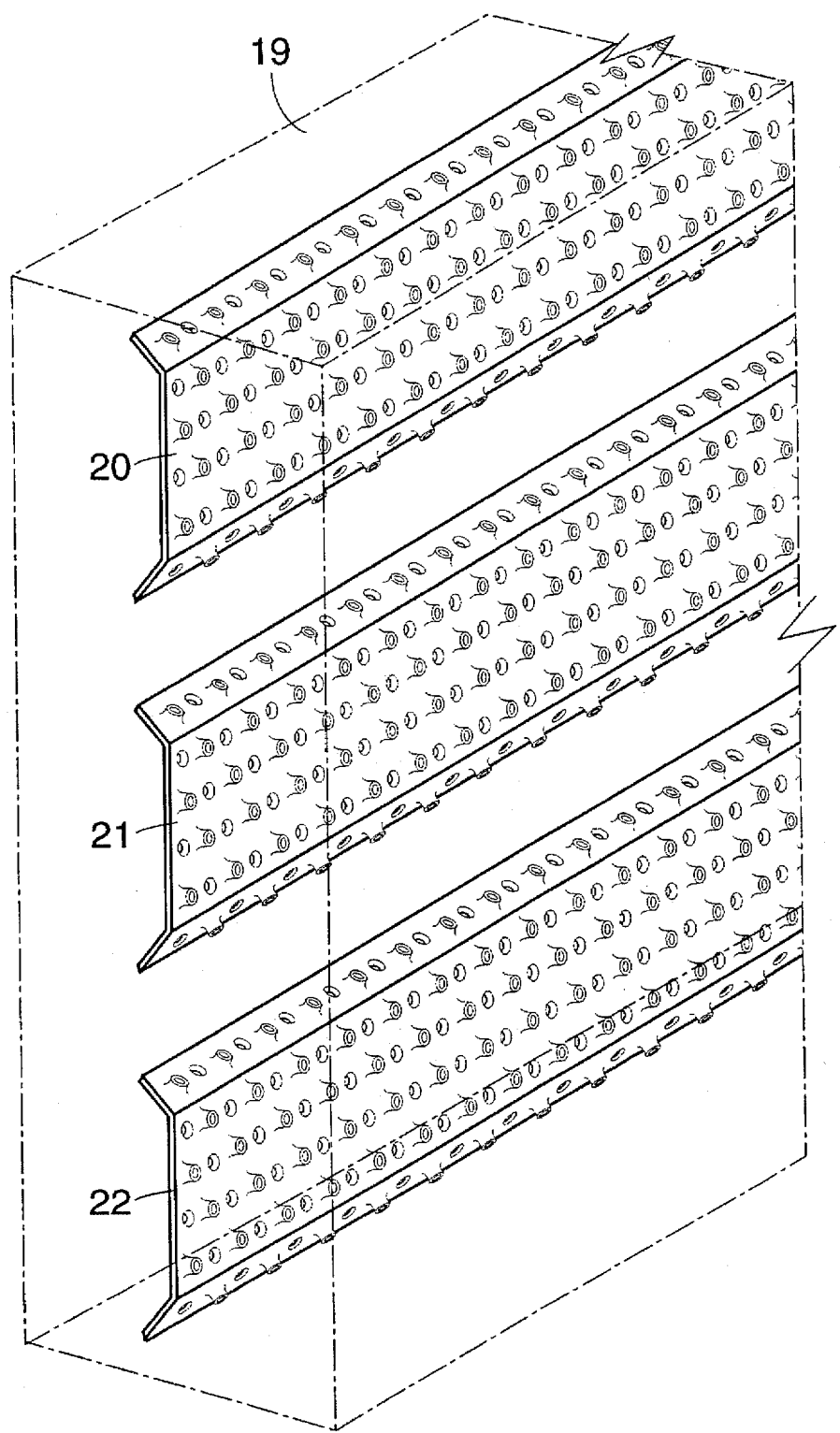
FIG. 9 shows a block-like composite structure having three reinforcing metal sheets embedded therein.

The shape of the composite structure depends on the end use to which it is put. Thus in the composite structure shown in FIG. 9, the plastic body 19 which is a rectangular slab, is reinforced by a planar array of three parallel punched metal reinforcing strips 20, 21 and 22 embedded within the slab, the projections being on alternate sides of the strips. These strips are channel-shaped to resist bending forces applied to the structure.

Figure 10:
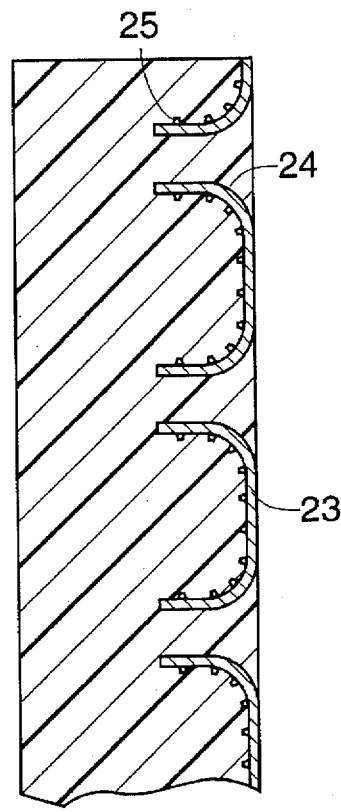
FIG. 10 shows a molded plastic part in which the reinforcing metal sheet is at the surface of the plastic body and is laminated thereto.

In the composite structure shown in FIG. 10, the metal reinforcing sheet 23 has round holes 24 punched therein, each bordered by projecting metal collars 25, the metal sheet being integrated with to the outer surface of a molded plastic body B; hence the metal reinforced sheet has all of its projections on the inner surface of the metal sheet.

A composite structure in accordance with the invention, because of the metal sheet embedded in the plastic body or integrated with its surface, can also function as a heat shield or heat sink in which the metal sheet absorbs heat radiating from an object to which the structure is attached.

Figure 11:
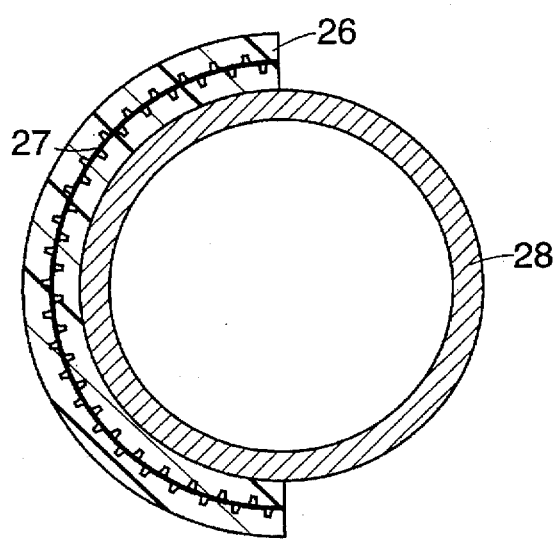
FIG. 11 shows a molded plastic part adapted to function as a heat shield.

Thus as shown in FIG. 11, a composite structure having a plastic body 26 and a metal reinforcing sheet 27 is molded to assume a semi-cylindrical form to conform to end shield a pipe 28 carry a heated fluid, the composite in this case acting as a heat shield. In this shield the reinforcing metal sheet lies adjacent the pipe. In practice, the heat shield may be spaced from the pipe. It is important to note that in all composite structures, in accordance with the invention, the reinforced punched metal sheet having tangs, collars or other projections bordering the punch holes, the metal sheet is not mechanically laminated to the plastic body, but is fully integrated therein, the plastic filling, the punched holes and enveloping the projections both inside and out so that the metal sheet is inseparable from the plastic body.

Molding Method

In molding a composite structure of the type disclosed above, use is made for this purpose of a mold whose cavity has a shape determined by that of the composite structure to be produced.

Supported within the mold cavity at a position therein determined by the position of the metal sheet in the composite structure, is the punched metal sheet whose shape is appropriate to that of the part to be produced. Then injected into the cavity is a molten plastic material of the desired composition, such as polyethylene or polypropylene. The molten plastic is injected under pressure so that in filling the mold cavity, the molten plastic is caused to flow through all holes punched in the metal sheet and to envelop the projections bordering the holes, inside and out.

When the molten plastic filling the mold cavity cures and solidifies, the metal sheet is then fully integrated with the resultant plastic body and the composite structure can then be separated from the mold.

When in the composite structure to be produced, the metal reinforcing sheet is embedded within the plastic body and is intermediate opposing surfaces of the body, then it has projections at alternate positions on opposing sides of the sheet as in FIGS. 3 and 4. The metal sheet, in this instance, is supported within the mold cavity, intermediate opposing sides thereof.

Figure 4A:
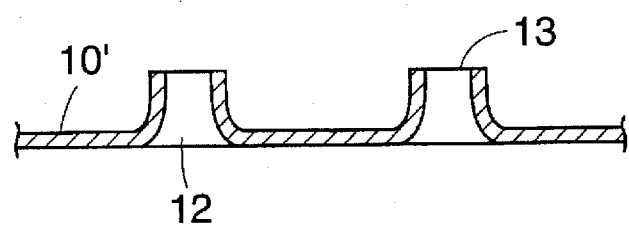
FIG. 4A is a section taken through a punched sheet in which the collars projecting from the holes all project from one side of the sheet.

But when in the composite structure to be produced, the metal reinforcing sheet is adjacent one surface of the plastic body, the metal sheet in this instance is supported against one side of the mold cavity, and its projections all on one side of the metal sheet, as shown in FIGS. 3A and 4A, the projections then going inwardly into the plastic body. But regardless of the nature and shape of the composite structure, the plastic fills the punched holes and envelops the projections inside and out to fully integrate the metal sheet with the plastic body.

While there has been shown preferred embodiments of the metal-reinforced, molded-plastic composite structures in accordance with the invention, and a method for producing the structure it will be appreciated that many changes may be made therein without departing from the spirit of the invention.

We claim:

1. A composite structure comprising:
   A. a molded body formed of synthetic plastic whose shape defines that of a bumper attachable to an automobile subjected to impact forces; and
   B. a metal sheet reinforcing the body to enhance its resistance to said impact forces which in the absence of the sheet may fracture the body, said sheet being formed of a ductile metal capable of being deformed without fracture of the sheet, said sheet having punched therein an array of round holes each bordered by a metal projection in the form of a metal collar, each hole being occupied by said plastic which also envelopes the projection both inside and out whereby the sheet is fully integrated with the plastic body and the resultant bumper is highly resistant to said impact forces.

2. A structure as set forth in claim 1, in which the plastic is polyethylene.

3. A structure as set forth in claim 1, in which the metal is stainless steel.

4. A structure as set forth in claim 1, in which the projections in alternate holes in the array are on opposite sides of the metal sheet.

5. A structure as set forth in claim 1, in which the projections are all on one side of the metal sheet.

6. A structure as set forth in claim 1, in which the bumper has a corrugated formation, and the metal sheet has a corresponding formation.

7. A structure as set forth in claim 1, in which the structure is shaped to define a bumper attachable to an automobile, and the plastic body has embedded therein at least two metal sheets at positions at which the bumper is exposed to impact forces.

8. A structure as set forth in claim 1, in which the plastic body is in the form of a rectangular slab having a planar array of punched metal sheets embedded therein, each sheet being in the form of a channel shaped strip.

9. A method for producing a composite structure of the type set forth in claim 1, comprising the steps of:
   A. forming a mold having a cavity whose shape is determined by the shape of the bumper to be produced;
   B. supporting said metal sheet having punched therein an array of holes each bordered by a metal projection in said mold at a position therein determined by the position of the metal sheet in said composite structure; and
   C. injecting into said cavity molten synthetic plastic material to cause the molten material to flow through the holes punched into the metal sheet and to envelop each projection both inside and out whereby when the molten plastic solidifies in the cavity, the metal sheet is then fully integrated with the resultant plastic body.

10. A method as set forth in claim 9, in which the metal sheet is supported intermediate opposing sides of the mold and the projections bordering the holes are alternately on opposing sides of the metal sheet.

* * * * *